United States Patent                                    [15]   3,691,187
Grau                                                         [45]  Sept. 12, 1972

[54] CERTAIN BENZOTHIAZOLYL- COUMARINS

[72] Inventor: Gerhard Grau, 17 Kirchenstrasse, 6703, Limburgerhof, Germany

[22] Filed: April 26, 1971

[21] Appl. No.: 137,681

[30] Foreign Application Priority Data

May 5, 1970   Germany..........P 20 21 899.9

[52] U.S. Cl. ..................260/304, 260/37, 260/158, 260/240.1, 260/244 R, 260/247.1, 260/268 BC, 260/286, 260/293.67, 260/294.8 C
[51] Int. Cl. ..............................................C07d 99/10
[58] Field of Search......................................260/304

[56] References Cited

UNITED STATES PATENTS 3,501,490   3/1970   Magoer et al..............260/304

Primary Examiner—Alex Mazel
Assistant Examiner—R. J. Gallagher
Attorney—Johnston, Root, O'Keeffe, Keil, Thompson & Shurtleff

[57]  ABSTRACT

Dyes of the formula:

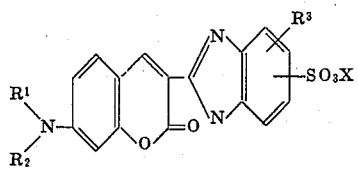

especially in the form of the sodium, potassium or ammonium salts of the sulfonic acids. The dyes are particularly useful for dyeing synthetic polyamide textile materials.

2 Claims, No Drawings

CERTAIN BENZOTHIAZOLYL-COUMARINS

This invention relates to dyes of formula I:

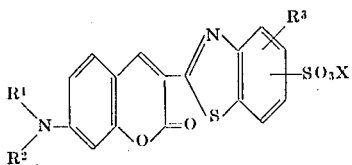

in which
R¹ and R² are identical or different and each individually stands for a methyl or ethyl group, or R¹ and R² together with the nitrogen atom form the radical of a five- or six-membered heterocyclic ring, R³ stands for hydrogen, chlorine, bromine, methyl, ethyl, methoxy or ethoxy and X stands for hydrogen or a sodium or potassium atom or a substituted or unsubstituted ammonium or cycloammonium radical.

Examples of five- or six-membered heterocyclic rings which may be formed by R¹ and R² together with the nitrogen atom are the radicals of pyrrolidine, piperidine, piperazine and morpholine.

Ammonium or cycloammonium radicals carry a positive charge, which is normally situated on the nitrogen atom but which may, due to mesomeric structures, be distributed in the molecule in some other way. Unsubstituted or substituted ammonium cations are preferred.

The ammonium ions are preferably derived from primary secondary or tertiary amines. Quaternary ammonium ions are also suitable. Other suitable ammonium ions are cyclic ammonium ions, such as as pyridinium, quinolinium, thiazolium and imidazolium ions.

The unsubstituted or substituted ammonium cations preferably contain a total of from four to 26 carbon atoms.

Specific examples of the radical $X^+$ are, apart from hydrogen, sodium and potassium:

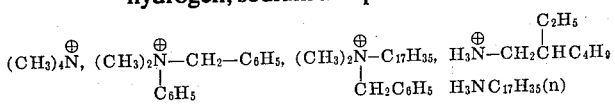

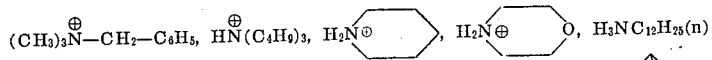

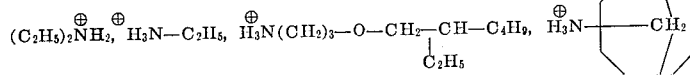

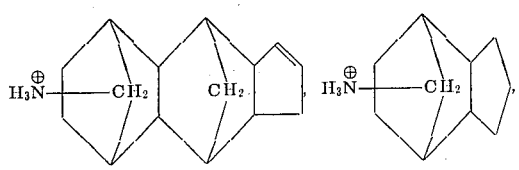

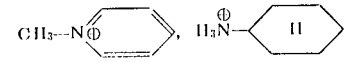

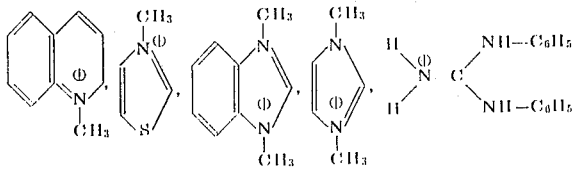

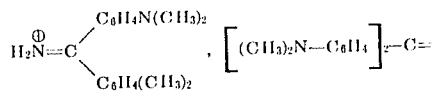

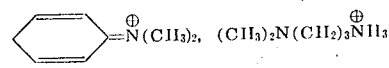

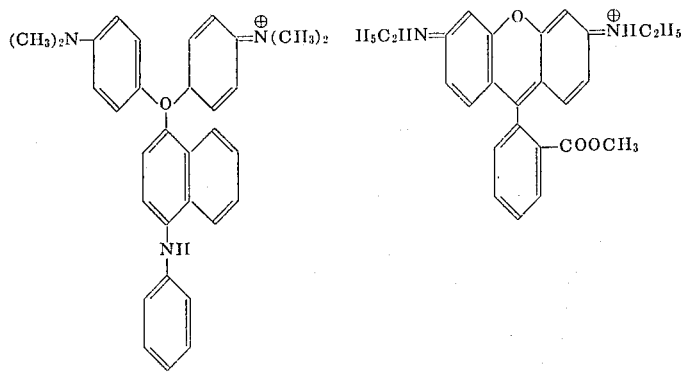

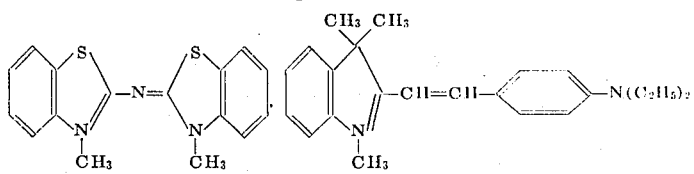

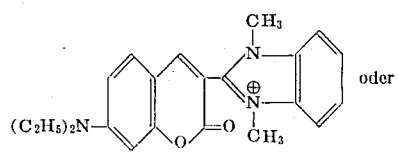

Of particular commercial interest are the dyes of the formula Ia:

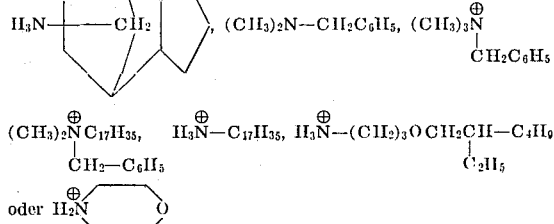

in which
R¹ and R² are identical and stand for methyl or ethyl and X has the meaning stated above.

Preferred ammonium cations contain, for example, alkyl radicals of from two to 17 carbon atoms, five- and six-membered cycloalkyl radicals containing from one to three rings, or benzyl radicals, or they are derived from saturated five or six-ring amines.

Specific examples of preferred ammonium cations are:

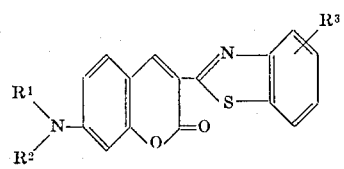

The new dyes may be manufactured by sulfonating the dyes free from sulfonic acid groups and having the formula II:

in which R¹, R² and R³ have the meanings stated above with respect to formula I.

Suitable sulfonating agents are the agents normally used for such a purpose, e.g., oleum containing from 5 to 50 percent of free sulfur trioxide and chlorosulfonic acid.

When oleum is used sulfonation is advantageously carried out at temperatures between 5° and 100°C and preferably between 30° and 60°C, whilst in the case of chlorosulfonic acid temperatures between 90° and 120°C are used.

Where use is made of oleum having a concentrating of free sulfur trioxide lower than 5 percent or of sulfur trioxide addition compounds such as piperidine chlorosulfonic acid, sulfonation only occurs at a temperature well above 100°C.

The preparation of sulfonic acid salts is effected by reacting the sulfonic acid in water and/or organic solvents with an equivalent of sodium or potassium hydroxide or a nitrogen-containing organic compounds, preferably an amine, advantageously dissolved in water or an organic solvent or a mixture thereof.

An alternative method comprises the double reaction of an alkali metal salt, for example the sodium salt, of the sulfonic acid with an equivalent amount of the nitrogen-containing organic compound in the presence of water or an organic solvent or mixtures thereof.

Depending on its solubility in the diluent used, the salt with the organic cation is completely or substantially precipitated and is then isolated by filtration or it forms a solution, which is then evaporated to dryness.

The novel dyes vary in color from red to yellow to green according to the cation and have a high degree of brilliance. They are suitable for coloring solvents, paints, coating compositions, textiles, paper and plastics. The novel dyes are particularly suitable for dyeing textile materials of natural fibers and especially for dyeing synthetic fibers such as polyamides, of which nylon 6 and nylon 6.6 and compounds of similar structures may be specifically mentioned.

In the following Examples the parts are by weight unless otherwise stated.

EXAMPLE 1

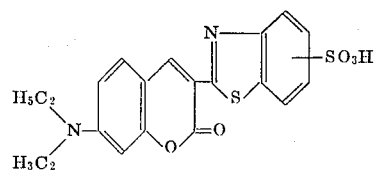

70 parts of 3-(benzthiazolyl-2')-7-diethylaminocoumarine are added to 700 parts of 10 percent oleum within 1 hour at an internal temperature of from 5° to 10°C. The dye passes into solution. The solution is heated to 50°C during 30 minutes, stirred at 50°C for 3 hours and then poured onto 3,500 parts of ice. The precipitated sulfonic acid is then filtered off and dried.

There are thus obtained 84 parts of a dye which has an orange color when dry but is deep red in aqueous dispersion. The free sulfonic acid is sparingly soluble in water. The free sulfonic acid is suspended in 700 parts of water and the suspension is adjusted to pH 8 by adding 160 parts of 20% NaOH solution at from 10° to 20°C. On heating to 60°C, the free sulfonic acid passes into solution as the sodium salt. To the solution at 60°C there are added 1,600 parts of saturated sodium chloride solution to precipitate the sodium salt of 3-(benz-thiazolyl-2'-)-7-diethylaminocoumarine sulfonic acid. After filtration, washing with common salt solution and drying at 70°C, there are obtained 105 parts of yellow dye.

EXAMPLE 2

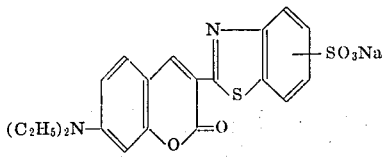

35 parts of 3-(benzthiazolyl-2'-)-7-diethylaminocoumarine are added to 350 parts of chlorosulfonic acid within 1 hour at an internal temperature of 10°C. The dye passes into solution. The reaction mixture is heated to 100°C and stirred at this internal temperature for 4 hours. After cooling, the mixture is poured onto ice and the precipitated sulfonyl chloride is filtered off and washed with water. The moist filter cake is suspended in 200 parts of water, and 24 parts of 50 percent sodium hydroxide solution are added at from 90° to 100°C. The resulting sodium salt of the sulfonic acid is precipitated by the addition, at 60°C, of saturated sodium chloride solution. After filtration, washing with common salt solution and drying at 70°C, there are obtained 41 parts of yellow dye of the above formula.

EXAMPLE 3

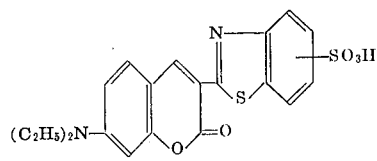

15 parts of chlorosulfonic acid are added dropwise to 100 parts by volume of ice-cooled pyridine. The excess pyridine is distilled off in vacuo at 60°C, and the residue is stirred into 50 parts by volume of nitrobenzene, to which 7 parts of 3-(benzthiazolyl-2')-7-diethylaminocoumarine are added at from 10° to 15°C, the mixture then being heated at 120°C for 2 hours and at 150°C for 7 hours.

After working up, a yellow dye of the above structure is obtained which dye dyes synthetic polyamide textile materials in brilliant greenish yellow shades.

EXAMPLE 4

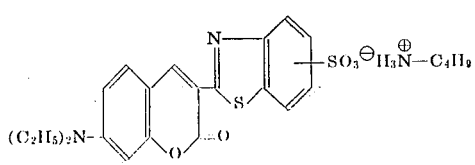

21 parts of 3-(benzthiazolyl-2')-7-diethylaminocoumarine sulfonic acid are suspended in 100 parts of ethanol, and 5 parts of n-butylamine are added at room temperature. The suspension is heated at from 60° to 70°C, the resulting salt of the sulfonic acid initially passing into solution for a short time before reprecipitating. The mixture is cooled and filtered. There are thus obtained 23 parts of yellow dye of the above structure.

EXAMPLE 5

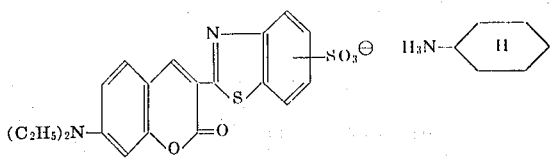

21 parts of 3-(benzthiazolyl-2')-7-diethylaminocoumarine sulfonic acid are suspended in 100 parts of ethanol, and 7 parts of cyclohexylamine are added at room temperature. The suspension is heated at from 60° to 70°C, the resulting dye salt passing temporarily into solution. On cooling, the salt is precipitated in a yellow crystalline form. It is filtered off and dried, and there are thus obtained 23 parts of dye.

EXAMPLE 6

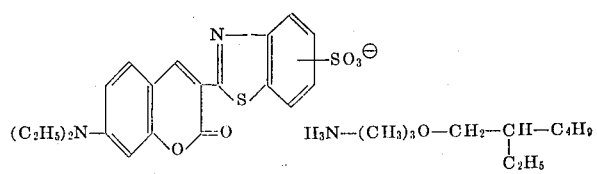

43 parts of 3-(benzthiazolyl-2')-7-diethylaminocoumarine sulfonic acid are added in a finely divided state to 400 parts of ethanol to form a slurry, 40 parts of ethylhexoxypropylamine are added at room temperature, and the suspension is heated at from 60° to 70°C. The resulting ammonium salt of the sulfonic acid passes into solution and it is necessary to evaporate the solution to dryness for its isolation.

EXAMPLE 7

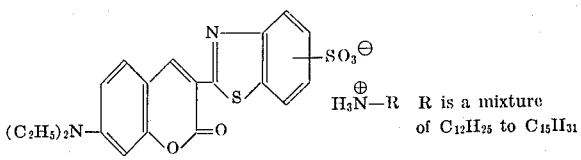

21 parts of 3-(benzthiazolyl-2')-7-diethylaminocoumarine sulfonic acid are suspended in 100 parts of dimethyl formamide, and a solution of 30 parts of a fatty amine mixture ($C_{12}$ to $C_{15}$) in 100 parts of dimethyl formamide is added at room temperature. The mixture is then heated at from 60° to 70°C, and the resulting ammonium salt immediately precipitates. The mixture is cooled to room temperature and filtered, and the solid residue is washed with dimethyl formamide and water and dried at 70°C to give 36 parts of a yellow dye salt of the above composition.

EXAMPLE 8

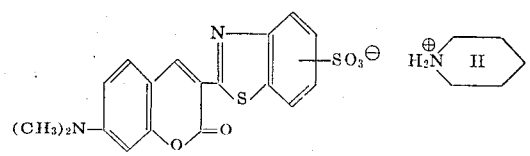

20 parts of 3-(benzthiazolyl-2')-7-dimethylaminocoumarine sulfonic acid are added in a finely divided form to 200 parts of water to form a slurry, which is then heated at from 60° to 70°C and adjusted to pH 8 by the addition of 5 parts of piperidine. The resulting solution is concentrated at subatmospheric pressure and the precipitate is filtered off and dried. There are thus obtained 25 parts of the yellow dye of the above structure.

EXAMPLE 9

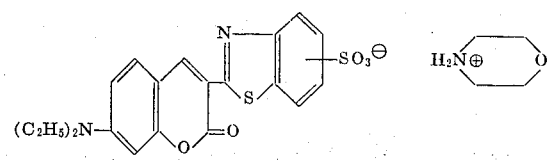

21 parts of 3-(benzthiazolyl-2')-7-diethylaminocoumarine sulfonic acid are added in a finely divided state to 200 parts of ethanol to form a slurry, to which 5 parts of morpholine are added and, to ensure complete reaction, the mixture is heated at from 60° to 70°C. The resulting morpholinium salt passes into solution for a short time and then separates out as a pale yellow finely divided precipitate. After filtering and drying, there are obtained 80 parts of the compound of the above structure.

EXAMPLE 10

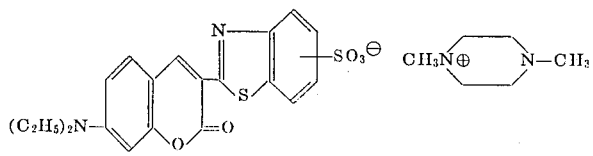

22 parts of the sodium salt of 3-(benzthiazolyl-2')-7-diethyl-aminocoumarine sulfonic acid are dissolved in 200 parts of water with heating and the solution is cooled to room temperature and mixed with a solution of 12 parts of 1,4-dimethylpyridinium methosulfate in 50 parts of water. The resulting solution is concentrated and the precipitated yellow dye salt is filtered off and dried.

EXAMPLE 11

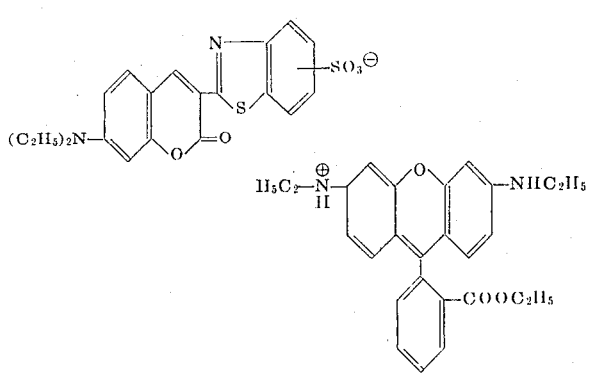

22 parts of the dye C.I. 45,160 are dissolved in 400 parts of water and mixed at room temperature, with a solution of 22 parts of the sodium salt of 3-(benzthiazolyl-2')-7-diethylaminocoumarine sulfonic acid in 300 parts of water. The dye salt separates as a dark red precipitate and is filtered off and dried. It dyes organic solvents and plastics in fluorescent orange shades.

EXAMPLE 12

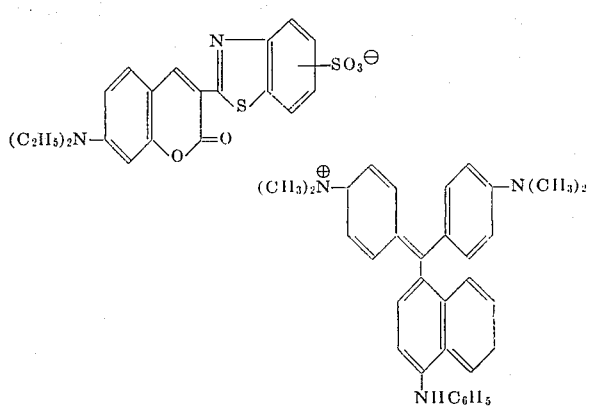

22 parts of the sodium salt of 3-(benzthiazolyl-2')-7-diethyl-aminocoumarine sulfonic acid are dissolved in 300 parts of water and combined, at room temperature, with a solution of 28 parts of Victoria Blue B (C.I. 44,045) in 12,00 parts of water. The precipitated dye salt is filtered off and dried at 60°C. There are thus obtained 33 parts of a dark green salt.

Using methods similar to those described in the above Examples, further dyes having similar properties are obtained using the sulfonic acid described in Example 1 or its alkaline metal salts together with the compounds indicated as cations in the following Table.

| Example | Cation | Shade of resulting dye |
|---|---|---|
| 13 | $(CH_3)_4N^{\oplus}$ | Yellow. |
| 14 | $(C_4H_9)_3N\overset{\oplus}{H}$ | Do. |
| 15 | $(CH_3)_2-\overset{\oplus}{\underset{C_6H_5}{N}}-CH_2C_6H_5$ | Do. |
| 16 | $H_3\overset{\oplus}{N}\!\!-\!\!\langle CH_2 \rangle$ | Do. |
| 17 | $H_2\overset{\oplus}{N}(CH_2CH_2OH)_2$ | Do. |

| Example | Cation | Shade of resulting dye |
|---|---|---|
| 18 | 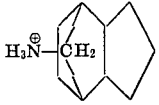 | Do. |
| 19 | 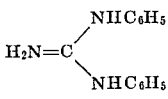 | Do. |
| 20 | 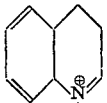 | Do. |
| 21 | 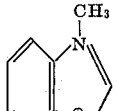 | Do. |
| 22 | 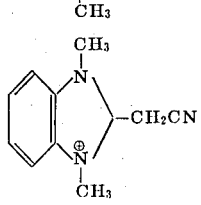 | Do. |
| 23 | 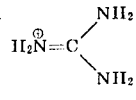 | Do. |
| 24 | C.I. 42,555 | Green. |
| 25 | C.I. 42,000 | Greenish yellow. |
| 26 | C.I. 45,160 | Scarlet. |
| 27 | C.I. 45,170 | Do. |
| 28 | C.I. 48,015 | Do. |
| 29 | C.I. 48,013 | Red. |
| 30 | 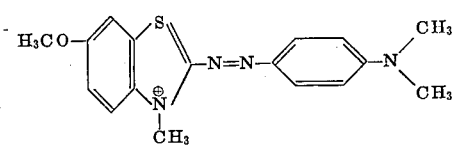 | Green. |
| 31 | 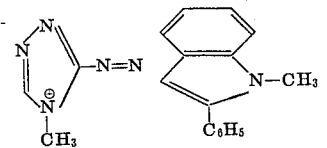 | Yellow. |
| 32 | 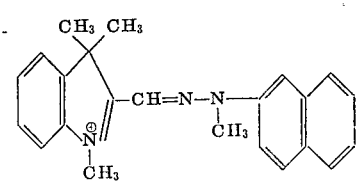 | Do. |
| 33 | 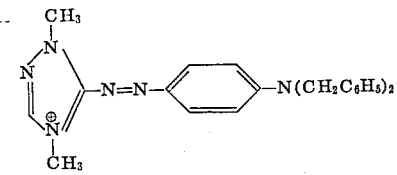 | Orange. |
| 34 | 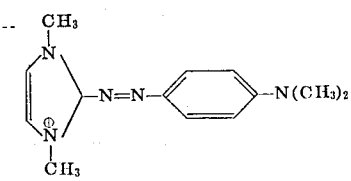 | Do. |

| Example | Cation | Shade of resulting dye |
|---|---|---|
| 35 | (structure: phenoxazine with OC$_2$H$_5$, (C$_2$H$_5$)$_2$N$^\oplus$=, =N(C$_2$H$_5$)$_2$) | Green. |
| 36 | (structure: acridine with CH$_3$ on N, H$_2$N$^\oplus$=, NH$_2$) | Yellow. |
| 37 | (structure: coumarin-benzimidazolium with (C$_2$H$_5$)$_2$N–, CH$_3$–N$^\oplus$, N–CH$_3$) | Do. |
| 38 | (structure: coumarin-benzothiazolium with (C$_2$H$_5$)$_2$N–, CH$_3$–N$^\oplus$, S) | Orange. |
| 39 | (CH$_3$)$_2$N$^\oplus$–CH$_2$–C$_6$H$_5$, C$_{17}$H$_{35}$ | Yellow. |
| 40 | H$_3$N$^\oplus$(CH$_2$)$_3$N(CH$_3$)$_2$ | Do. |
| 41 | H$_2$N$^\oplus$(C$_4$H$_9$)$_2$ | Do. |
| 42 | HN$^\oplus$(C$_4$H$_9$)$_3$ | Do. |
| 43 | H$_2$N$^\oplus$(—H)$_2$ | Do. |
| 44 | H$_3$NC$_{12}$H$_{25}$(n) | Do. |
| 45 | H$_3$N$^\oplus$C$_{17}$H$_{33}$(n) | Do. |
| 46 | H$_3$N$^\oplus$C$_{17}$H$_{35}$(n) | Do. |
| 47 | (CH$_3$)$_3$N$^\oplus$CH$_2$C$_6$H$_5$ | Do. |

I claim:
1. A dye of the formula

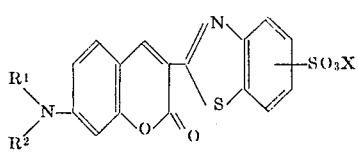

in which
R$^1$ is methyl or ethyl,
R$_2$ is methyl or ethyl and
X is hydrogen, sodium, "potassium" "ammonium" or substituted ammonium containing a total of from four to 26 carbon atoms.

2. A dye of the formula defined in claim 1, in which X is hydrogen, sodium, potassium, ammonium, "iso-octylammonium" oleylammonium, laurylammonium, di-n-butylammonium, di-isobutylammonium, cyclohexylammonium, dicyclohexylammonium, tributylammonium, phenylbenzyl-dimethylammonium, stearyl-benzyl-dimethylammonium, benzyl-tri-"methylammonium" or dimethylaminopropylammonium.

* * * * *

PO-1050
(5/69)

UNITED STATES PATENT OFFICE
CERTIFICATE OF CORRECTION

Patent No. 3,691,187                    Dated September 12, 1972

Inventor(s) Gerhard Grau

It is certified that error appears in the above-identified patent and that said Letters Patent are hereby corrected as shown below:

Cover page, left hand column, insert  -- [73] ASSIGNEE: Badische-Anilin&-Soda-Fabrik Aktiengesellschaft, Ludwigshafen am Rhein, Germany --

Column 3, line 58 " oder " should read -- or --

Signed and sealed this 13th day of March 1973.

(SEAL)
Attest:

EDWARD M. FLETCHER, JR.                ROBERT GOTTSCHALK
Attesting Officer                       Commissioner of Patents